(12) United States Patent
Stiles

(10) Patent No.: US 6,314,446 B1
(45) Date of Patent: Nov. 6, 2001

(54) METHOD AND SYSTEM FOR MONITORING TASKS IN A COMPUTER SYSTEM

(75) Inventor: Ian James Stiles, Salem, UT (US)

(73) Assignee: Stiles Inventions, Salem, UT (US)

( * ) Notice: Subject to any disclaimer, the term of this patent is extended or adjusted under 35 U.S.C. 154(b) by 0 days.

(21) Appl. No.: 08/829,312

(22) Filed: Mar. 31, 1997

(51) Int. Cl.⁷ .................................................... G06F 9/00
(52) U.S. Cl. ......................... 709/100; 345/347; 345/348
(58) Field of Search ..................... 709/100, 101, 709/102, 103, 104, 105, 107, 108; 345/334, 347, 348

(56) References Cited

U.S. PATENT DOCUMENTS

| | | | |
|---|---|---|---|
| 4,263,647 | 4/1981 | Merrell et al. ...................... | 364/101 |
| 4,851,998 | 7/1989 | Hospodor ............................ | 364/300 |
| 4,868,782 | 9/1989 | Lawrence et al. .................. | 364/900 |
| 5,115,495 | 5/1992 | Tsuchiya et al. ................... | 395/200 |
| 5,150,117 | 9/1992 | Hamilton et al. .................. | 340/973 |
| 5,293,377 | 3/1994 | Gould ................................. | 370/94.1 |
| 5,301,348 * | 4/1994 | Jaaskelainen ...................... | 395/800 |
| 5,323,393 | 6/1994 | Barrett et al. ..................... | 370/85.8 |
| 5,386,525 | 1/1995 | Noack ................................ | 395/400 |
| 5,463,552 | 10/1995 | Wilson, Jr. et al. ................ | 364/436 |
| 5,481,707 | 1/1996 | Murphy, Jr. et al. .............. | 395/650 |
| 5,542,047 | 7/1996 | Armstrong ....................... | 395/200.11 |
| 5,566,339 | 10/1996 | Perholtz et al. ................... | 395/750 |
| 5,636,376 * | 6/1997 | Chang ............................... | 709/104 |
| 5,673,404 * | 9/1997 | Cousins et al. .................... | 395/347 |
| 5,872,909 * | 2/1999 | Wilner et al. .................... | 395/183.14 |

OTHER PUBLICATIONS

"Database Developer's Guide with Visual C⁺⁺4, Second Edition", Roger Jennings & PeterHipson, Apr. 96.*

* cited by examiner

Primary Examiner—Majid Banankhah
(74) Attorney, Agent, or Firm—Lloyd W. Sadler

(57) ABSTRACT

A system and method for displaying the status of tasks or processes in a computer system is described. The method is designed to receive the expected time for task completion and by comparing the time used per task computes a task status indicator. The method displays the resulting status to the user in an intuitive manner with four configurations indicating: process running normally, process running intermittently, process stopped normally, and process halted unexpectedly. The device when properly used by the method combine to form a communications device which clearly and easily communicates to the user of the computer system the operational status of the selected program, routine or process and does so without requiring the allocation of significant continuous processing overhead.

6 Claims, 3 Drawing Sheets

METHOD AND SYSTEM FOR MONITORING TASKS IN A COMPUTER SYSTEM

SOFTWARE APPENDIX

This specification includes a software appendix which is intended to be a part of the disclosure herein. The software appendix includes 22 pages of software source code, used in the implementation of one preferred embodiment of the invention. This software appendix is hereby incorporated into the disclosure of this invention.

BACKGROUND OF THE INVENTION

1. Field of the Invention

This invention relates generally to computer systems, particularly computer systems capable of operating one or more tasks or processes simultaneously. Specifically this invention relates to the method for monitoring tasks in a computer system. Also, this invention still more specifically relates to a system for indicating the status of tasks in real-time and which can be operated at the application level of the computer system's process priority. When used in combination with a computer displayable communications device, this invention serves to provide an accurate visual indicator to the user of the status of running processes in a computer system. For the purposes of this patent application, computer system is defined as one or more computational devices, employing processing units and methods of communicating data between such processing units. Such a computer system may be a single "stand-alone" computational device or a "network" of more than one computational device.

Providing a visual indicator of the status of running processes to a computer system user is useful for providing information the user can use to recognize what tasks are operating as expected, what tasks are delayed and often what tasks and combinations of tasks are causing delay. Such a visual indicator also helps the user recognize when a delay is normal and when the processing of a task has been halted, stopped or delayed. Prior techniques include task monitor methods that provide only a static icon that in effect tells the user to wait, without telling the user how long or even if the process has halted. Such techniques provide misleading information. Another prior art method of solving the task status communication problem involves a monitor and a monitor device that is continually animated, thereby using valuable processing cycles within the computer, such use of processing cycles is often unacceptable and self-defeating. For example, it is often important to know how much of the processing power of a computer is being used by a particular process, and to simultaneously know whether that particular process is still operating. Continuously animated monitor devices will generally give misleading information under these conditions.

An alternative is to have no process monitor at all. Such an approach means that the user of the computer system will be left without any information as to whether a requested computer process is running or has stopped. Failing to have process status information is particularly troublesome where the process is expected to take a not insignificant amount of time. Examples of such processes are: data base searches, complex mathematical or modeling functions, network (including Internet) searches and access, electronic communication, saving, restoring, disk media back-up and other disk operations.

2. Description of Related Art

Computer status monitors are well known in the prior art. Such examples as a moving bar, a series of dots, a hourglass, a clock or a flashing curser are well established. Status monitors of other electronic devices are similarly well known, including the following examples: flashing or strobing lights, panels of light emitting diodes, liquid crystal display devices, mechanical toggle indicators, transparent or semi-transparent panels the permit visual access to the interior of a device whose motion itself give some indication of activity. Other computer system monitor systems include: a system for monitoring computer networks especially during non-business hours for failures and/or major damage that can occur due to fire, theft, water, temperature fluxuations or employee sabotage; a distributed network monitor system for providing status information as to nodes and communication links; a dedicated processor for task I/O and memory management which maintains the status of tasks running on the system and which schedules the execution of tasks; a method for sharing databases among a plurality of applications on IBM mainframe computers; a method for obtaining and controlling the status of a networked peripheral; a method for managing and controlling network bandwidth; a power management symbology display system for helicopters; a method for routing messages in a communications network; a display terminal for data screens associated with host and remote computer processing; a process for analyzing the performance of computer peripherals; and a fault monitor for a numerical control system. However, the applicant knows of no computer process monitor which is designed to present the appearance, thereby communicating, of activity without requiring significant processing resources for its maintenance. Moreover, the applicant is unaware of a computer status monitor which is specifically designed to present a view of the operation of a specific computational process as opposed to the operation of the computer system as a whole.

For general background material, the reader is directed to U.S. Pat. Nos. 4,263,647, 4,851,998, 4,868,782, 5,115,495, 5,150,117, 5,293,377, 5,323,393, 5,386,525, 5,463,552, 5,481,707, 5,542,047, 5,566,339. Each of the above references is hereby incorporated by reference in its entirety for the material disclosed therein.

SUMMARY OF THE INVENTION

It is desirable to provide a method of monitoring the status of a process operating within a computational device, which when used eliminates the uncertainty of the computer user in determining whether a requested program or process is operating, halted or is running only with some difficulty. Furthermore, it is desirable to have a computer task monitor which operates without adversely affecting the system performance of the computer. It is also desirable to have a computer process task monitor that operates in an intuitive manner communicating the status of selected processes independently as opposed to providing only some potentially misleading information as to the operating status of the total computer system.

Accordingly, it is a primary object of this invention to provide a method of providing the operational status of a program or process operating within a computer system which informs the user in an intuitive manner whether a specific process or group of processes are running, stopped, running with difficulty, or unexpectedly halted.

Another object of this invention is to provide a method of providing the operational status of a program or process operating within a computer system which does not require continuous processing overhead.

A further object of this invention is to provide a computer task monitor which provides the appearance of motion when a process is running, by giving the appearance of jerky motion when a process is running with difficulty, by giving the appearance of lack of motion when a process is stopped, and by giving the appearance of being broken when a process has unexpectedly halted.

A still further object of this invention is to provide a method for task monitoring that can be assigned to a specific program or process to display the status of that particular program or process.

These and other objects of this invention, which will be clear to those of ordinary skill in the art upon review of this patent specification and claims, are achieved by an invention which permits the display of status information using a static device which is designed to be easily modifiable to reflect and to communicate the status of one or more processes within a computer system.

DETAILED DESCRIPTION OF THE INVENTION

This invention provides a method and system for calculating and the status of tasks in a computer system. Computer system is defined by the applicant to include one or more computational devices capable of executing prearranged instructions wherein said computational devices include one or more processing units. The method of the invention acts in association with existing applications on the computer and is "called" from other computer applications. When the invention is properly employed the user will be provided important status information about on-going, stopped and/or halted processes within the computer system processing environment.

Figure 1:
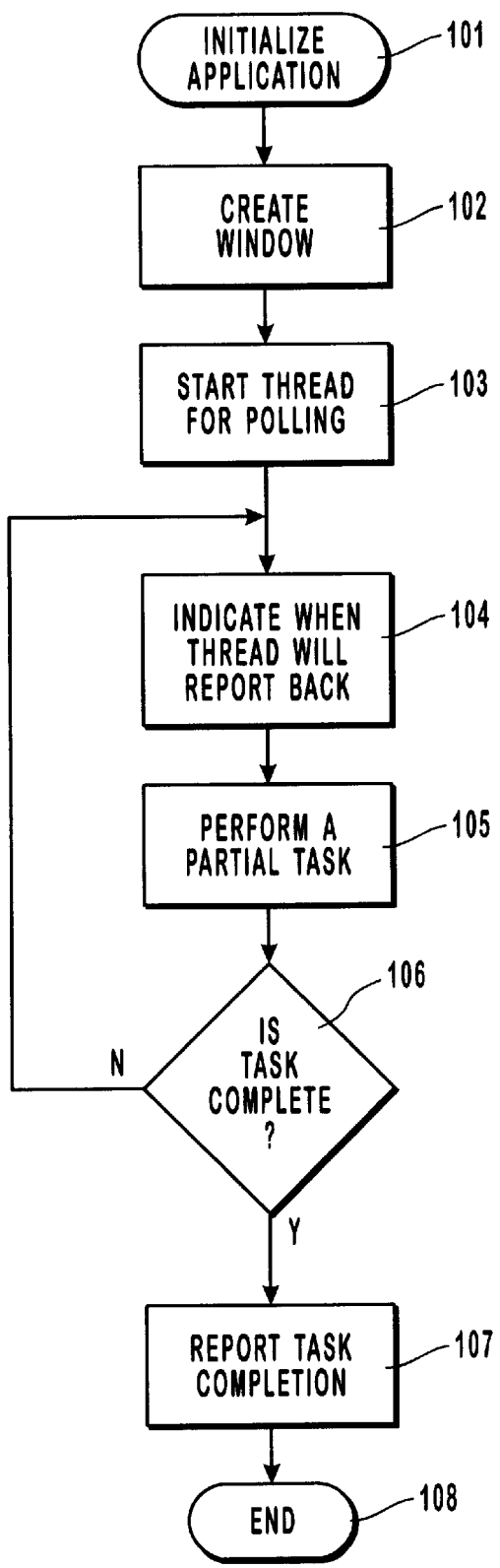
FIG. 1 depicts top level flow chart of the process of this invention.

FIG. 1 shows the preferred embodiment of the method or process of the invention. The invention, in its best mode of operation, is composed of two classes: a StatusMonitor class, which is a class that provides a window for displaying task status information in a list form; and a ThreadMonitor class which is a class for tracking threads running in a system. In its preferred embodiment the invention is practiced by an application program initializing, or calling, the StatusMonitor class 101. Next, a window is created 102 for displaying the status information for individual tasks. The window created in this step provides the visible portion of the user interface to the process. In the best mode of the invention the create window step is performed by computer code located in the StatusMonitor class. Next, a thread is started 103. This started thread performs two major functions, first, it periodically polls the monitored threads and second, it allows the updating of the display, that is the created window for status. In the preferred best mode of the invention, the software performing this step is contained within the StatusMonitor class. Next, the ThreadMonitor routine receives an indication 104 as to when the started thread will report back. This step permits the tracking of response times of threads for determining visual display status, allows the monitoring of a thread's status and, in the best mode of the invention, is located is located in ThreadMonitor class. Next, some partial task is performed 105. The test is made as to whether the task is complete 106. If the task is not complete then the process loops back to indicate when the thread will report back 104. If the task is completed then a report of task completion is made 107 and the procedure is finished 108 for determining the status of the started thread.

Figure 2:
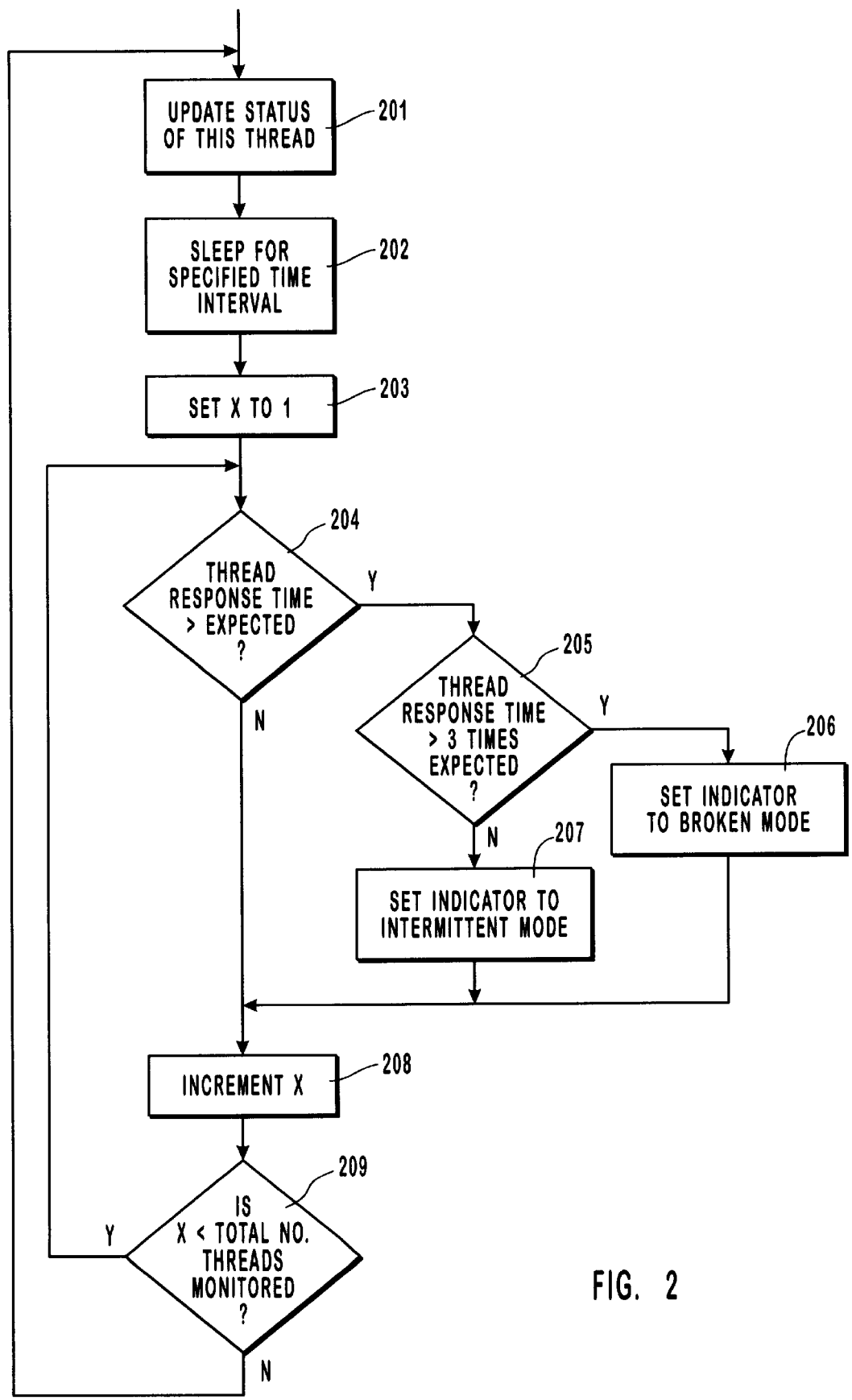
FIG. 2 depicts a detail flow chart of the "Start Thread" step of the process of the invention.

FIG. 2 provides increased detail as to the sub-steps of the "Start a Thread" 103 step of the invention. First, the status of the monitoring thread is updated 201. This step provides an indication of the health of the monitoring system and allows the indication of the system itself. In the best mode of the invention, the code performing this step is located in the StatusMonitor class. Next, the monitor process sleeps, going inactive, for a specified time interval 202. This step permits the process to relinquish to the computer processor time for the computer to perform its work, allows for real time display of the frequency of the tasks without overtaxing the computer processor. In the best mode of the invention, the software is located in the StatusMonitor class.

The variable X is then set to one 203. This setting of the loop variable prepares for looping through the thread list for proper loop setup. In the best mode of the invention, this step is performed in the ThreadMonitor code.

Next, a test is made as to whether the thread response time is greater than expected 204, if so, the test of whether the thread response time is greater than a multiple of expected response time, in the best mode the multiple is three, 205. If the response time measured is greater than expected by a multiple then the indicator is set to "Broken" mode 206. This step provides the visual indication of broken status, notifying the user that the process (or thread) is not operating normally. In the best mode of the invention, this step is performed in the ThreadMonitor class.

If the test of step 205 is that the thread time is not greater than a multiple of the expected response time, then the indicator is set to "Intermittent" mode 207, thereby providing a visual indication of sporadic status, notifying the user that the process is not operating normally. In the best mode of the invention, this step is performed in the ThreadMonitor class.

After performing steps 206, 207 and if the thread response time of test step 204 does not exceed expectations then X is incremented 208. If X is less than the total number of threads 209 being monitored then the process starting at step 204 is repeated. Otherwise the process loops back to step 201.

Figure 3:
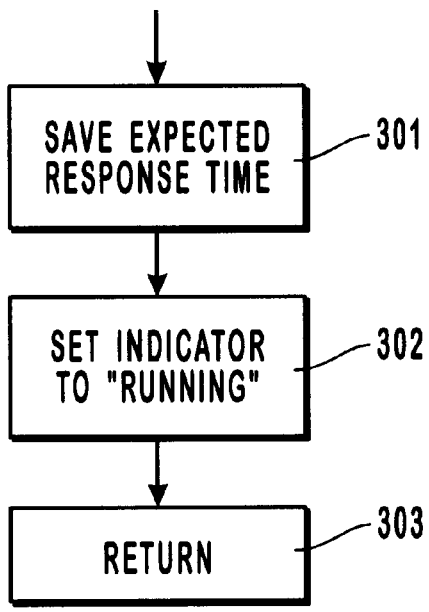
FIG. 3 depicts a detail flow chart of the "Indicate when Thread will Report" step of the process of the invention.

FIG. 3 shows a detail flow chart of the "Indicate when Thread will Report" step of the process of the invention. First, the expected response time is saved 301. Next, the indicator is set to "Running" 302 for display to the user, indicating that the task is operating within expectation. The subroutine then returns to perform a partial task 303.

Figure 4:
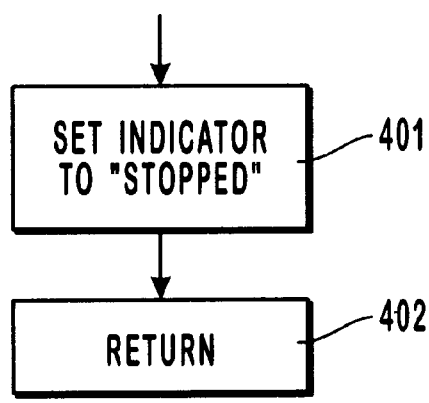
FIG. 4 depicts a detail flow chart of the "Report Task Completion" step of the process of the invention.

FIG. 4 depicts a detail flow chart of the "Report Task Completion" step of the process of the invention. The indicator is set to "Stopped" 401 and the routine returns 402 to finish step 108.

I claim:

1. A computer task monitor process comprising:
   (A) creating a status window in a computer software display screen;
   (B) receiving a task for monitoring;
   (C) monitoring said received task, wherein said monitoring said received task further comprises starting a thread for polling said monitored task and receiving an indication as to when said started task will report back, thereby tracking a response time for determining a status of said monitored task; and (D) displaying said status of said monitored task, wherein said displaying the status includes setting an indicator to a mode selected from the group consisting of Running, Broken, Intermittent, and Stopped.

2. A computer task monitor process, as recited in claim 1, further comprising cycling through all tasks being monitored periodically and updating said display of status of said monitored task.

3. A computer task monitor process as recited in claim 1 wherein said creating a computer software display window further comprises creating a list of monitored tasks and the status of each monitored task.

4. A computer task monitor process as recited in claim 1 wherein said receiving a task for monitoring further comprises receiving a expected time for completion of said received task and an identifier for said received task.

5. A computer task monitor process as recited in claim 1 wherein said monitoring said received task, further comprises comparing elapsed time with the value of expected time for completion of said received task.

6. A computer task monitor process as recited in claim 1 wherein said monitor process operates with display device for visually communicating the status of said monitored tasks.

* * * * *